Nov. 28, 1939.  R. W. TODD  2,181,287
AUTOMATIC CHANGE SPEED MECHANISM
Filed April 1, 1936   8 Sheets-Sheet 1
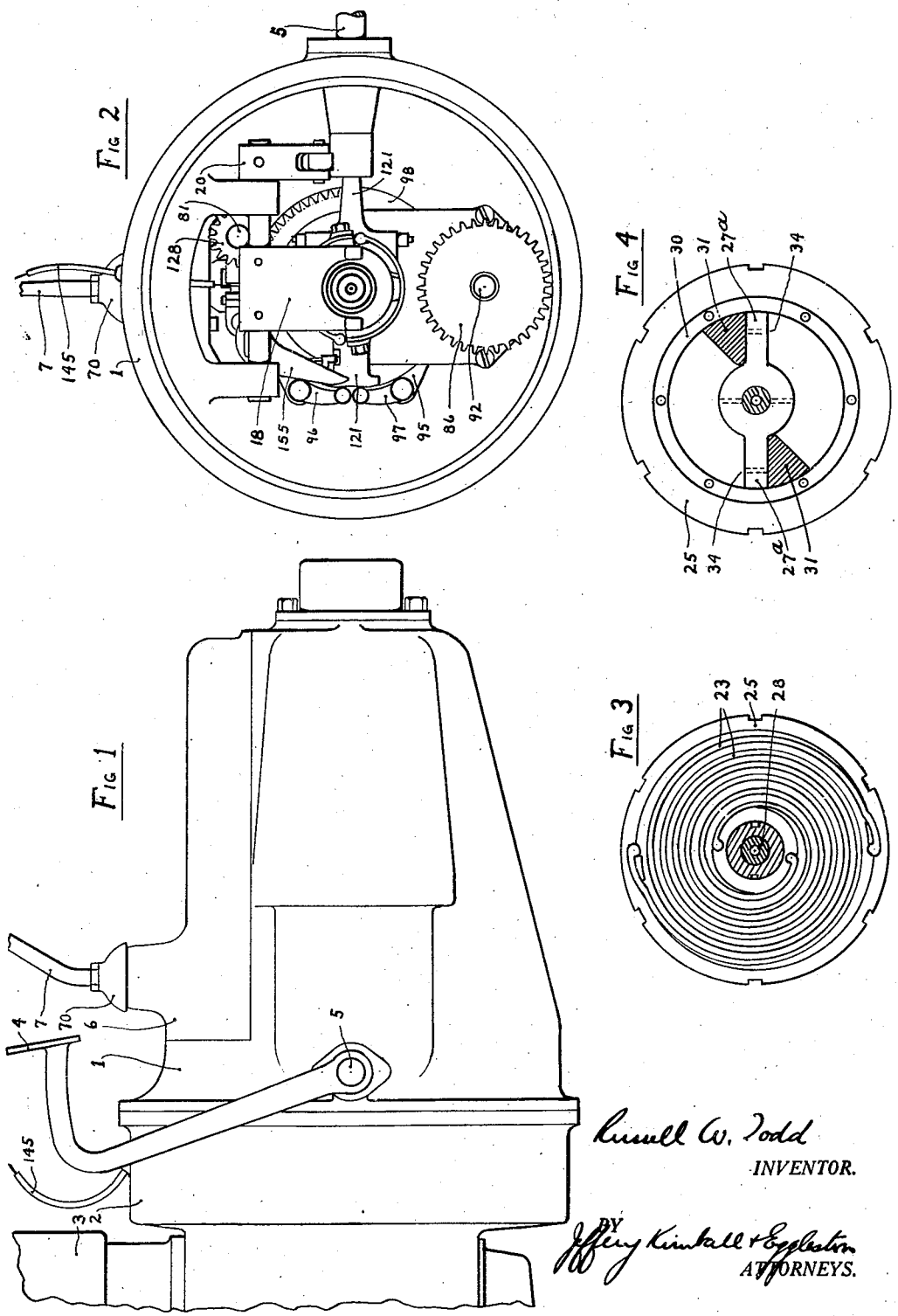
Russell W. Todd
INVENTOR.
BY Jeffery Kimball + Eggleston
ATTORNEYS.

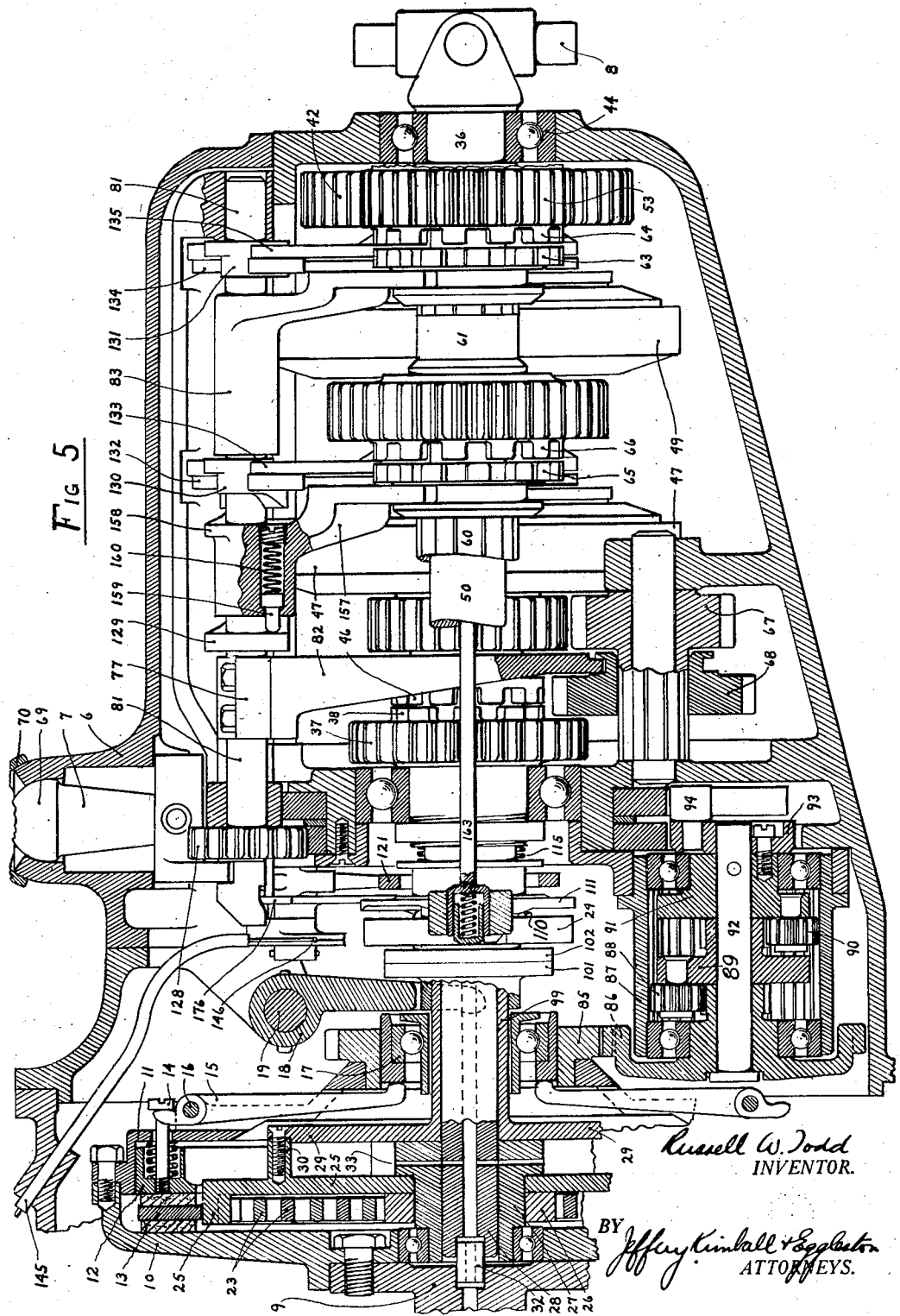

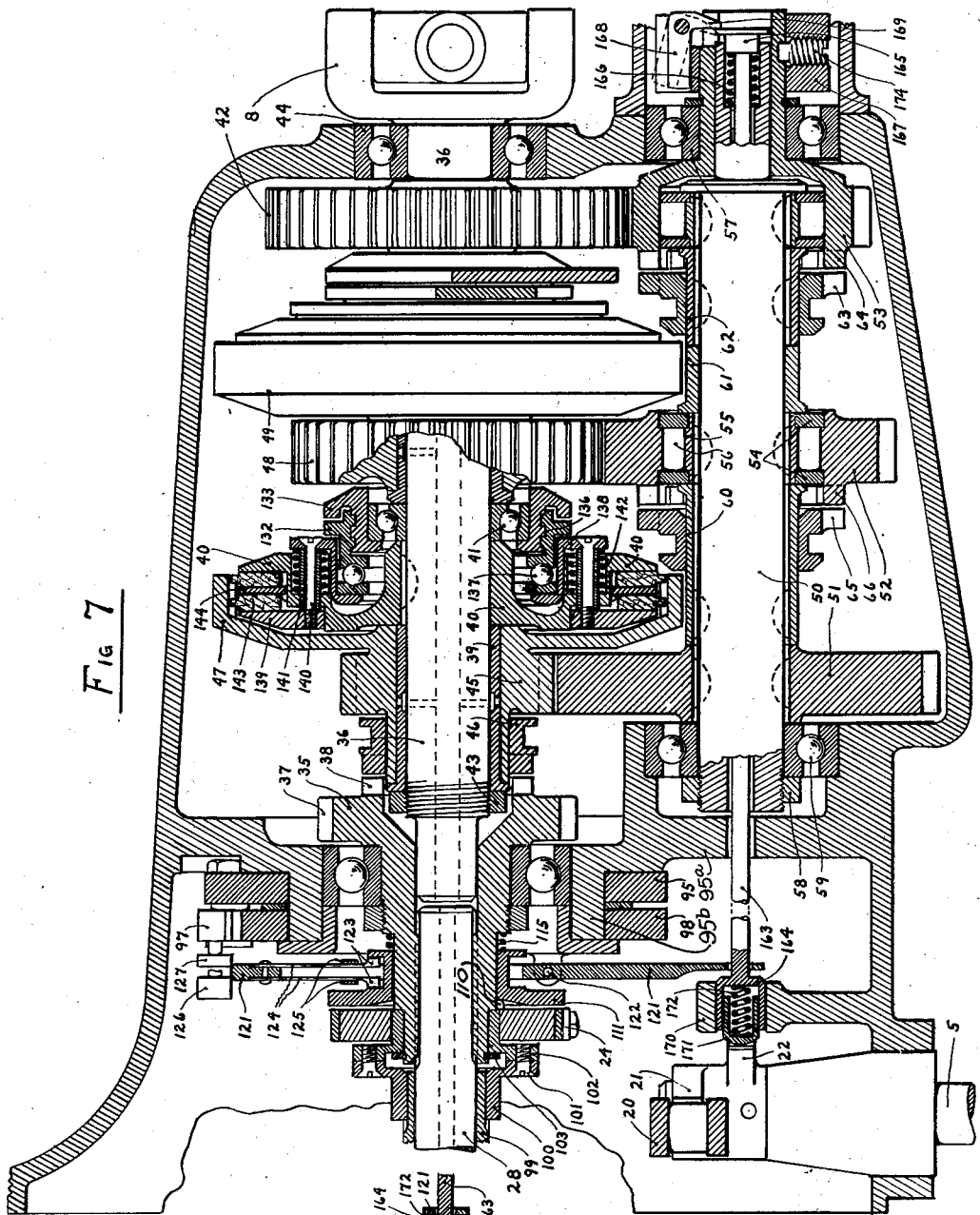

Nov. 28, 1939.  R. W. TODD  2,181,287
AUTOMATIC CHANGE SPEED MECHANISM
Filed April 1, 1936  8 Sheets-Sheet 4.
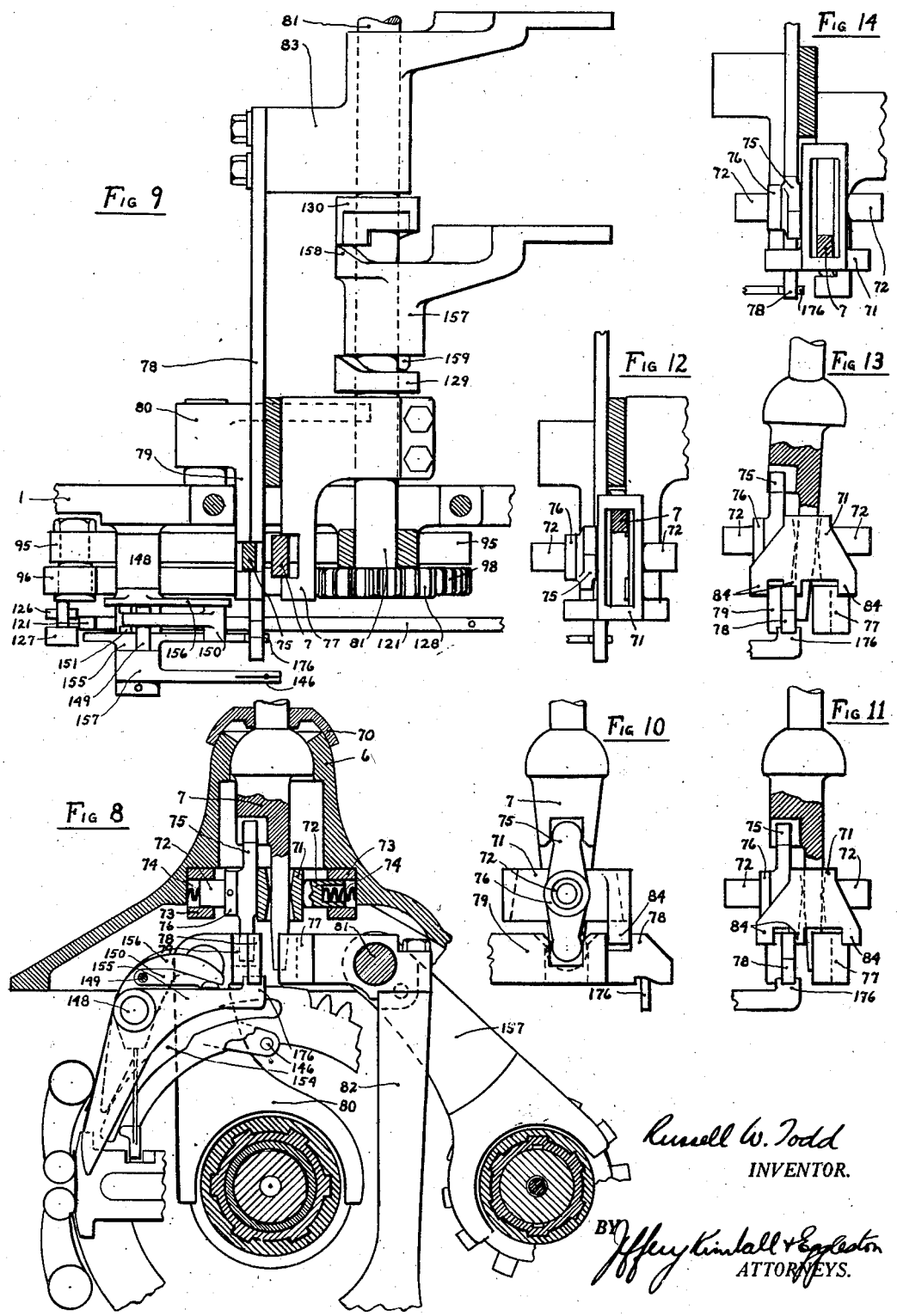

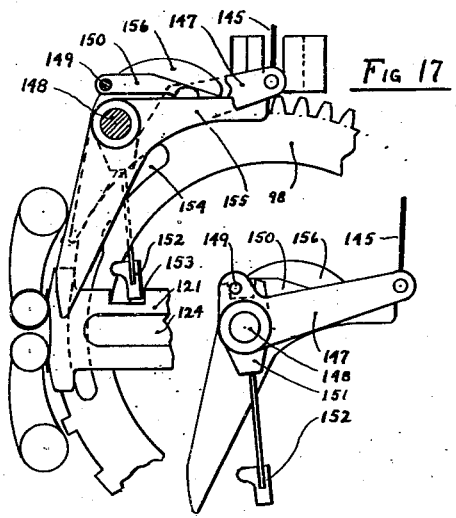
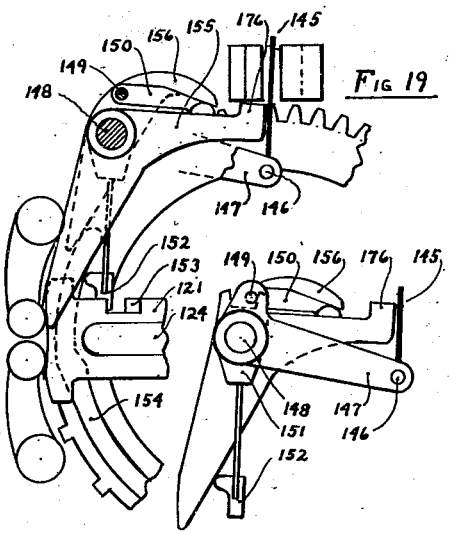
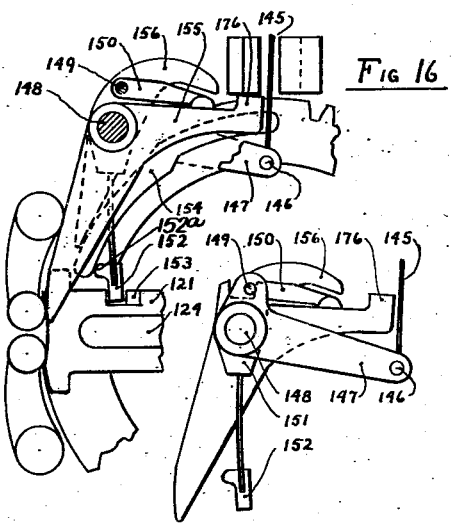
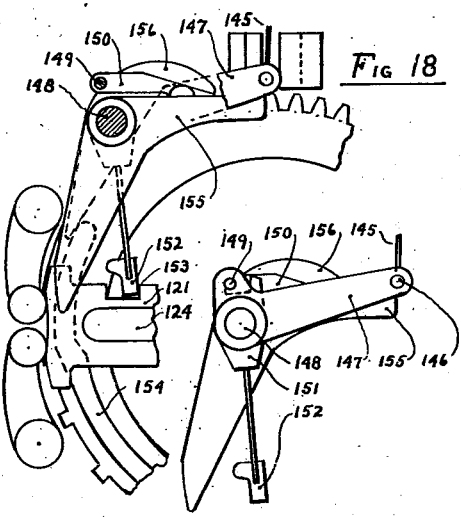
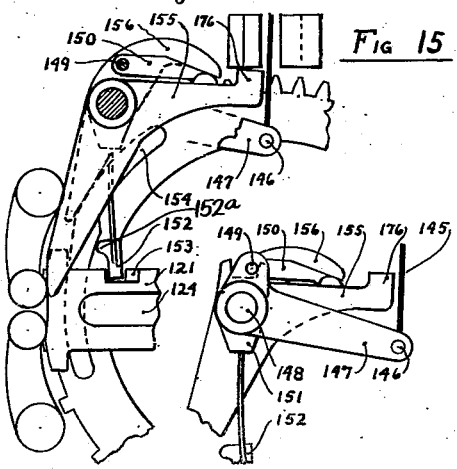

Nov. 28, 1939.　　　　R. W. TODD　　　　2,181,287
AUTOMATIC CHANGE SPEED MECHANISM
Filed April 1, 1936　　　8 Sheets-Sheet 6
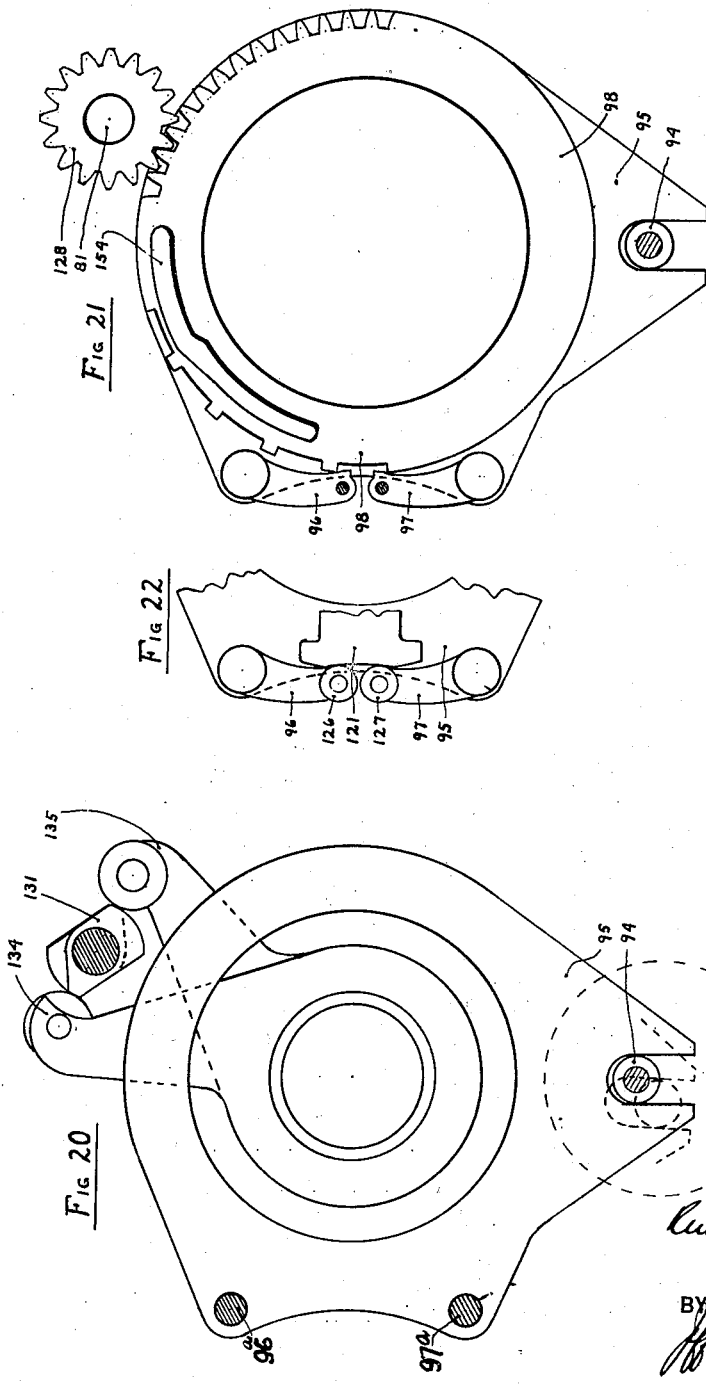
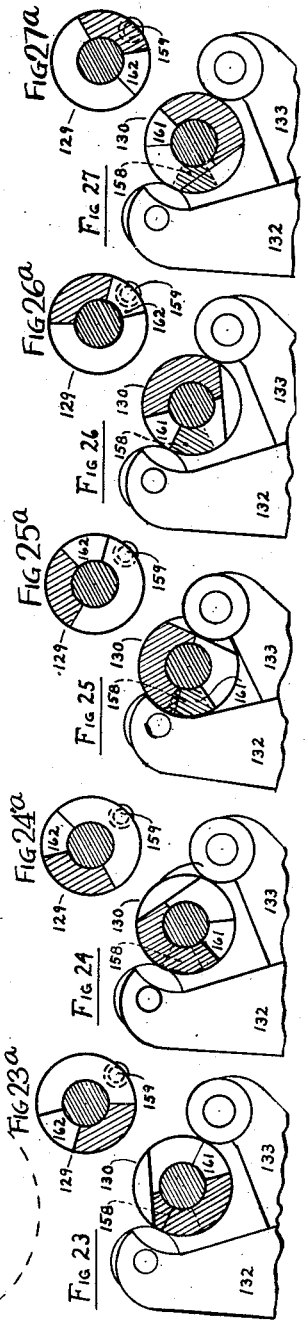
Russell W. Todd
INVENTOR
BY
Jeffery Kimball & Eggleston
ATTORNEYS Nov. 28, 1939.   R. W. TODD   2,181,287
AUTOMATIC CHANGE SPEED MECHANISM
Filed April 1, 1936   8 Sheets-Sheet 7
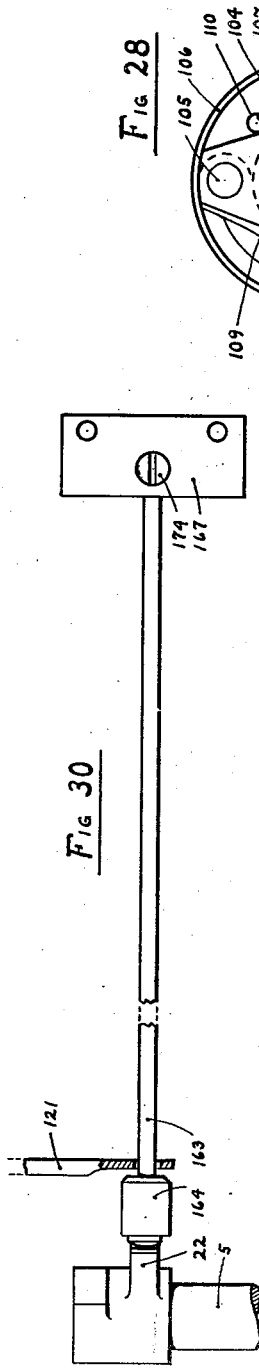
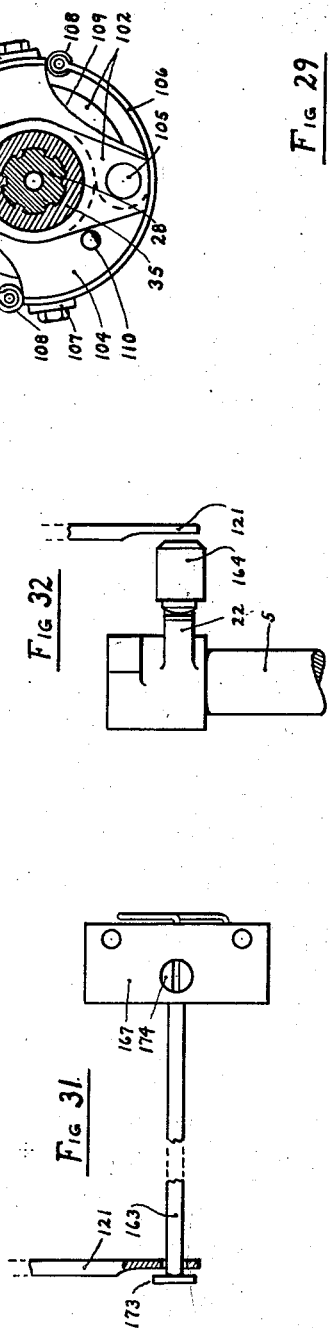
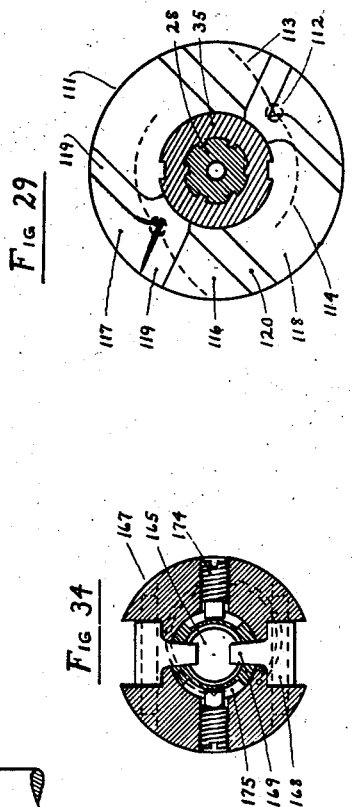
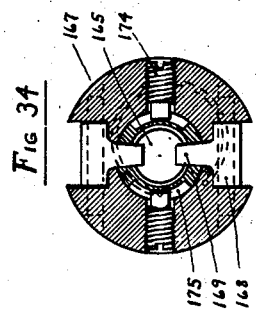
Russell W. Todd
INVENTOR.
BY Jeffery Kimball & Eggleston
ATTORNEYS.

Nov. 28, 1939.　　　R. W. TODD　　　2,181,287
AUTOMATIC CHANGE SPEED MECHANISM
Filed April 1, 1936　　　8 Sheets-Sheet 8
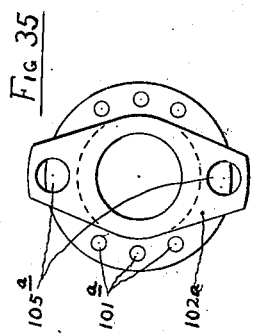
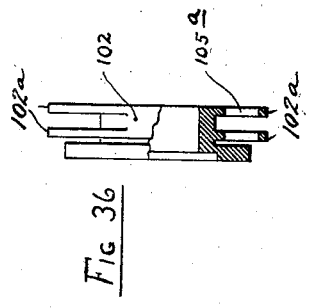
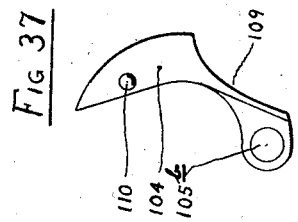
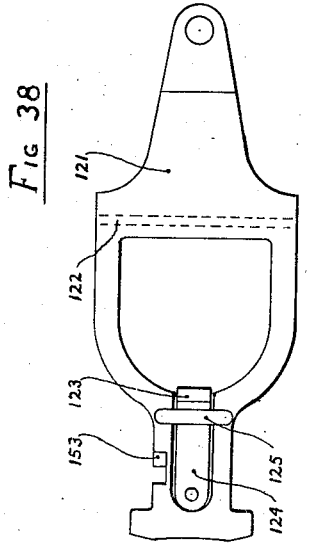
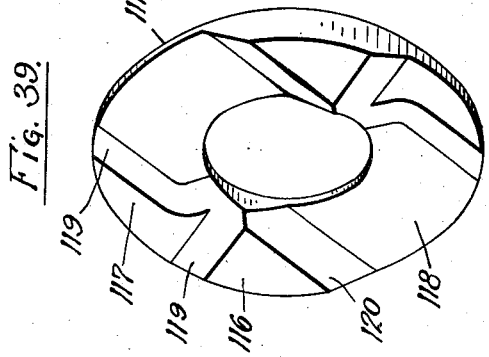
Russell W. Todd
INVENTOR.
BY Jeffery Kimball & Eggleston
ATTORNEYS.

Patented Nov. 28, 1939

2,181,287

UNITED STATES PATENT OFFICE 2,181,287

AUTOMATIC CHANGE SPEED MECHANISM

Russell W. Todd, Bronxville, N. Y.

Application April 1, 1936, Serial No. 72,015

31 Claims. (Cl. 74—336)

The invention relates to an automatic transmission, for automobiles or the like, operating generally in accordance with the principles described in my prior Patent No. 1,944,585 of January 23, 1934, in which is disclosed a positive drive type of transmission subject to the joint control of engine speed and torque responsive devices which are correlated to establish a neutral zone, or zone of "no-shifting", corresponding substantially to that determined by the characteristics of the engine and to effect up and down shifts of the transmission drive ratio in response to the occurrence of speed-torque conditions of the engine beyond the limits of such zone. An object of this invention is to improve and simplify the automatic controls and the manner in which they are correlated, to the end of effecting economy of construction, insuring smoother and more certain operation and, incident thereto, less liability to derangement of the parts.

A further object of the invention is to provide one or more supplemental controls adapted to function under certain conditions which arise during operation of the vehicle and which are of such a character as to require a departure from the normal response of the speed-torque controls to such conditions, either by effecting or preventing a change of drive ratio, as may be appropriate. While these supplemental controls in the preferred forms illustrated are of special advantage in combination with transmission controls of the character shown in my prior patent, in which speed and torque-responsive devices manifest the corresponding engine conditions directly and by mechanical means, their application is not limited thereto but, as will presently appear, extends to other forms of automatically controlled transmissions in which the shifting is effected by power normally under the control of any speed-torque gauge device adapted to function in substantial accordance with or in predetermined relation to engine conditions.

The foregoing and also other features and advantages of the invention are exemplified in the transmission control illustrated in the accompanying drawings, in which Fig. 1 is an outside view of the gear box, in side elevation, shown in conventional relation to the rear of an automobile engine;

Fig. 2 is a front elevation of the gear box;

Fig. 3 is a front elevation of the torque spring housing and spring through which the motor drives;

Fig. 4 is a rear elevation of the spring housing shown in Fig. 3, with the cover removed to show the spring check parts;

Fig. 5 is a side elevation, partly in section, showing the general arrangement of the parts within the transmission housing;

Fig. 6 is a side elevation, partly in section showing the clutch throwout yoke and operating cam;

Fig. 7 is a plan view partly in section showing the general arrangement of the lay shaft and other parts in the box;

Fig. 8 is a front elevation of the control lever mounting and the parts it operates;

Fig. 9 is a plan view of the parts shown in Fig. 8;

Fig. 10 is a side elevation from the right, of the control lever connections in the neutral position;

Fig. 11 is a front elevation of the parts as shown in Fig. 10;

Fig. 12 is a plan view of the control lever and connections in the forward drive position;

Fig. 13 is a front elevation of the same parts;

Fig. 14 is a plan view of the parts shown in Figs. 10, 11, 12 and 13, in the reverse drive position;

Figs. 15 to 19 are front elevations of the control parts which regulate the engagement and disengagement of a solid drive in an intermediate speed; the front parts being shown separately in each figure for clearness;

Fig. 20 is a front elevation of certain parts having to do with power shifting;

Fig. 21 is a front elevation of the parts immediately ahead of those in Fig. 20;

Fig. 22 is a front elevation showing the position of the control parts immediately in front of those in Fig. 21;

Figs. 23 to 27 are diagrammatic front elevations of the cams which operate the direct drive connection and the engagement of a solid drive in an intermediate gear, the forward cam being shown above its actual position for clearness;

Fig. 28 is a rear elevation of the centrifugal speed governor which registers engine speed;

Fig. 29 is a front elevation of the face cam against which the speed governor shown in Fig. 28 operates;

Fig. 30 is a plan view, more or less diagrammatic, of the parts by which the car speed governor, as modified by clutch pedal position, acts to supersede the normal speed-load control;

Fig. 31 is a plan view of the parts connecting the car speed governor with the speed-load control;

Fig. 32 is a plan view of the connections for superseding the speed-load control by clutch pedal position;

Fig. 33 is a side elevation, partly in section, of the mounting of the car speed governor;

Fig. 34 is a rear elevation of the car speed governor;

Fig. 35 is a rear elevation of the centrifugal speed governor of Fig. 28, the weights being removed;

Fig. 36 is a side view of the governor frame;

Fig. 37 is an elevation of one of the governor weights;

Fig. 38 is an elevation of the member hereinafter referred to as the trip shoe;

Fig. 39 is an enlarged perspective view of the face cam of Fig. 29.

As in my prior patent above referred to, the present invention is shown in a form adapted to the currently conventional automobile, the automatic transmission being mounted in a box 1 secured, as customary, to the fly wheel housing 2 at the rear of the engine 3. A conventional clutch pedal 4, mounted on pedal shaft 5 is also provided, and in the removable cover 6 of the gear box is a hand control lever 7, likewise conventional in location but having only limited functions as below described. At the rear of the box the universal joint 8 (Figs. 5, 7) is adapted to be coupled to the front end of the usual propeller shaft. The crankshaft 9 of the motor, Fig. 5, carries a fly wheel 10, upon which is firmly fixed a clutch cover 11. The pressure plate 12, which drives the plate 13, is provided with several pins 14 engaged by release fingers 15, hinged to the cover at 16, by which it is opened in conventional manner through throwout bearing 17 and yoke 18. The yoke 18 is fixed to shaft 19, which is actuated through arm 20 by cam 21 on the pedal shaft 5, Figs. 2 and 6. The cam piece 21 also has a cam 22, functioning as hereinafter described.

As above stated, various features of the present invention are applicable to any automatic gear box under the control of what for convenience is herein termed a speed torque gauge device, i. e. control mechanism either sensitive to or operating in substantial accordance with changes of speed-torque conditions of the engine obtaining throughout operation of the vehicle, but as herein illustrated and described the speed-torque gauge mechanism is of the same general character as that disclosed in my prior patent, including a spring 23, (Figs. 3 and 5) interposed in the drive, and comprising the torque-responsive element, and a fly-weight governor (indicated at large in Figs. 5 and 7 by reference 24 and shown in detail in Figs. 28, 35–37) driven by the engine and comprising the speed-responsive element. The same terminology is also employed herein to designate parts having the same or similar functions as in the prior patent.

As respects the torque spring and as distinguished from the organization shown in the prior patent, it will be observed that the clutch driven plate 13 is slidably keyed to a housing 25, Figs. 3, 4 and 5, which thus takes the drive from the motor. Within the housing 25 are two spiral springs 23, their outer ends anchored to the housing. The inner ends of springs 23 are anchored to spring hub 26, which in turn is keyed to the hub of a member 27, the latter being keyed to clutch shaft 28, so the drive from the motor, taken by the outer spring ends, is transmitted to the clutch shaft from the inner ends of the springs, through the hubs mentioned; and the yield of the spiral springs is used, as later described, to measure the torque output of the motor. An oil check, Figs. 4 and 5, is preferably provided to prevent too rapid yielding of the springs, or too violent a recoil. This consists of a plate or housing cover 29 firmly fixed to rim 30, which is integral with housing 25 and inside of which cover swings the double ended vane 27ª between two stops 31, integral with the cover 29. The hub portion of the vane 27ª is adapted to swing freely but with a close fit between the inner ends of the stops 31; and in the matter of thickness the vane is also a close fit in the space enclosed by cover 29. Oil from the engine is fed from a passage in the center of the crankshaft 9, by means of a hollow transfer plug 32, journaled in the crankshaft and also in the end of clutch shaft 28, to an oil passage within the clutch shaft. Cross passages 33 in the vane member lead to the space within the check, so that when the springs 23 yield or recoil, vane 27, swinging to and fro within the check housing, must displace the oil from one side to the other. If desired, check valves (not shown) may be provided at the outer ends of passages 33 to prevent a return flow of oil; and it is usually desirable to provide small passages 34 through the vane members to prevent too great a restriction of movement. It may also be found desirable to provide check valves (not shown) in said passages 34, to allow relatively free motion under increased torque, but slower recoil under diminished torque output.

The transmission provides for a plurality of forward speeds, under automatic control, all of which are normally over-running or one-way drives, as in my prior patent; there is also provided a reverse drive, and, in addition, a solid or two-way drive in an intermediate forward speed for use in descending long or steep hills, all through the following described gears and clutches. The drive from the motor through clutch shaft 28, Fig. 7, is taken through splines to member 35, which provides a pilot bearing for the front end of the primary shaft 36, and has a gear cut on it at 37 for reverse driving, and a set of jaws 38 for forward driving. The primary shaft 36 carries the universal joint 8 and is thus directly connected to the propeller shaft. Upon primary shaft 36 is mounted a bushing 39, the inner member 40 of a friction clutch, the same being keyed to the shaft, an anti-friction bearing 41, adapted to take end thrust, another bushing similar to 39, another inner clutch member, keyed to the shaft, similar to 40, another bearing similar to 41, and the gear 42, which is keyed to the shaft. These parts are all clamped up on the shaft, by the nut 43, against a suitable anti-friction bearing 44 which carries the shaft at the rear. Journaled for rotation on bushing 39 is a gear member 45, having a splined hub at the forward end carrying a jaw clutch member 46. Said clutch 46 is slidable on the splined hub of gear 45 by means of connections with the hand lever 7, as later described; and is adapted to engage with the jaws 38 on member 35 when moved forward. Gear member 45 also comprises the outer or driving member of friction clutch 47. The gear 48 is similarly journaled on its bushing, and comprises the outer, driving member of clutch 49.

The lay shaft 50, Fig. 7, carries constant mesh gear 51, which is keyed to it. Shaft 50 also carries gears 52 and 53, which are driven from the lay shaft by one-way clutches which provide positive drive in the forward direction, but allow the shaft to turn freely in the opposite direction; or in other words, which allow the gears to overrun the shaft in the forward direction. The one-way clutches shown are of the conventional roller type. Gear 52 rides upon and is located by two rings 54, which are mounted on the inner clutch member 55. Member 55 has flat faces, and is keyed to the lay shaft; and the rollers 56 work between said flat faces and the inner bore of gear 52. The rings 54 not only carry gear 52, but also spacers and springs for locating the clutch rollers 56. The gear 53 is similarly driven from the lay shaft by a roller clutch, although it is not carried on the lay shaft but is mounted in an anti-friction bearing 57 in the box and serves as a pilot bearing support for the rear end of the lay shaft. The inner members of the one way clutches are clamped up on the lay shaft by nut 58 through anti-friction bearing 59, gear 51, splined bushing 60, which is keyed to the shaft, bushing 61, and splined bushing 62, which is also keyed to the shaft. On bushing 62 is splined for fore and aft movement a jaw clutch member 63, adapted to engage jaws 64 on the side of gear 53 when moved to the rear. On bushing 60 is splined a similar jaw clutch member 65, adapted to engage jaws 66 on gear 52. In Fig. 5 is shown a reverse idler gear 67, which meshes with gear 51 on the lay shaft and on the hub of gear 67 is splined gear 68, adapted to mesh with gear 37 when moved forward.

When clutches 46, 63 and 65 are open, and gear 68 is away from gear 37, as shown in Figs. 5 and 7, no drive can be transmitted from the motor to the propeller shaft and the box is in "neutral". For forward driving the operator opens clutch 13 with pedal 4 and by means of lever 7, as later described, moves clutch 46 into engagement with the jaws 38 on member 35; and then allows the clutch 13 to engage. The operator has no direct control or choice of speeds selected in forward drive, but as later described the automatic control system functions to open friction clutches 47 and 49, when the car is at rest, so that when the main clutch is engaged the drive from clutch 46 is taken to the lay shaft through gears 45 and 51 and thence to gear 53 by its one-way clutch; the latter then drives gear 42, the primary shaft 36 and the propeller shaft in a reduced ratio, thus providing the lowest forward speed. For second speed, the automatic mechanism closes friction clutch 49 as described below, which connects the outer member 49, and also gear 48, to the inner member and the primary shaft. The drive is then taken from the lay shaft 50 to gear 52 through its one-way clutch, and thence to gear 48 and the primary shaft; and due to the consequent increase in relative speed of the primary shaft to that of the lay shaft, gear 53 is caused to over-run. For the next higher speed, or direct drive, the automatic mechanism closes clutch 47, connecting member 47 with member 40. In this case the drive from clutch 46 is taken directly to member 47, and thence to the primary shaft; and as clutch 49 is not opened, gears 52 and 53 both overrun on the lay shaft. Shifting down to second speed from high is accomplished by the automatic opening of clutch 47, the drive then being taken by gears 52 and 48, and clutch 49. Similarly shifting from second to low is accomplished by the automatic opening of clutch 49, returning the drive to gears 53 and 42.

For reversing, the operator, through the means of lever 7 as later described, after withdrawing clutch 46 and putting the transmission in "neutral", slides gear 68 into mesh with gear 37 and simultaneously engages jaw clutch 63 with the jaws 64 on gear 53. Clutch 64 enables reverse drive to be imparted to gear 53, from the lay shaft, the one-way roller clutch driving it only in the forward direction.

For solid drive in an intermediate speed, hereinbefore the second speed, the operator as described below trips automatic mechanism which then opens clutch 47, closes clutch 49, and engages jaw clutch 65 with the jaws 66 on gear 50. Normal automatic control is then suspended, until the operator restores it as later described.

The control lever 7 is mounted on a spherical seat 69, Fig. 5, and retained by a cap 70 and, referring to Figs. 8–14, it will be seen that the lower end of lever 7 extends through frame 71, mounted for limited sideways movement on its hollow supporting arms 72 in carriers 73 mounted on cover 6. Springs 74 tend to hold the frame 71, and lever 7, in a central position; and the frame is held from tilting by the closeness of fit between its flat top and the under side of lid 6. On one of the supporting arms 72 is journaled the rocker or lever 75, suitably retained in place by a ring 76, Fig. 8. The upper end of rocker 75 fits into a cut or square notch in lever 7, Figs. 8 and 10. The lever 7 and the parts it engages with are shown in Figs. 8–11 in the "neutral" position, in which the lever is in its median position fore and aft, and also sideways; and frame 71 is also in its median position sideways. It will be seen that the lower end of lever 7 is partly in engagement with fork member 77; and the lower end of rocker 75 is partly in engagement with bar 78 and extension 79 of fork 80. Member 77 is slidably supported on shaft 81 for fore and aft movement, and is firmly secured to the upper end of fork 82, Fig. 8, which engages with the idler gear 68, Fig. 5, for moving same in and out of mesh with gear 37. The bar 78, Fig. 9, is firmly secured to fork 83, which also is slidably mounted on shaft 81 for fore and aft movement, and engages with the jaw clutch 63, Figs. 5 and 7. The fork 80, whose extension 79 may be engaged by the rocker 75, engages with the clutch 46, for moving same into and out of mesh with clutch 38 on member 35. Thus, in this form of the invention, for forward driving the operator swings the top of lever 7 to the left, and pushes it forward. The sideways motion swings the bottom end of lever 7 out of mesh with the fork 77, Figs. 12 and 13; and simultaneously moves the frame 71 and rocker 75 to the right, so that the teeth 84, Figs. 10, 11 and 13, on the under side of frame 71 lock bar 78 in its disengaged position and prevent fork 77 from moving forward; and at the same time the rocker 75 is put fully in mesh with extension 79 of fork 80. The forward motion of the handle on lever 7, by the operator, swings the lower end of the lever to the rear, which in turn swings the bottom of rocker 75 to the front; which moves fork 80 forward and engages clutch 46 with member 35. The reverse trains are thus held out of driving relation, and clutch 46 takes the power to the primary and lay shafts as the case may be, for forward drive under control of the automatic mechanism as described later.

For reversing, the operator swings the top of lever 7 to the right, and pulls it to the rear. This swings the lower end of lever 7 to the left, and with it frame 71, which carries the rocker 75 into full engagement with bar 78 and out of engagement with fork 80; and brings the end of lever 7 into full engagement with fork 77. At the same time the teeth 84 are moved to the left from their position as shown in Fig. 11, so that fork 80 cannot move forward, but fork 77 and bar 78 are free to move forward and backward respectively. The lower end of lever 7, and the rocker 75, through forks 77 and 83, then move gear 68 into mesh with gear 37, and clutch 63 into engagement with gear 53.

Power to effect changes of gear ratio is taken from the gear 85, Fig. 5, permanently fixed to the clutch cover 11. Gear 85 meshes with gear 86, mounted in a planetary reduction housing 87, and its inner end serves as the sun gear for the planetary train 88. The driven member 89 of this train acts as the sun gear for a second reducing train 90, the driven member 91 of which is pinned to shaft 92, which also serves as support for member 89. Flange 93 is firmly fixed to member 91, and carries an eccentric pin 94. This pin, Figs. 5 and 20, engages in a slot in the lower side of the rocking frame 95 and, since the power for shifting is taken directly from the engine, serves to oscillate said frame whenever the engine runs. As shown in Fig. 7, the rocking frame bears against the front face of wall 35ª, being journalled on the annular flange 95ᵇ which projects forwardly of the wall and which is concentric with the clutch shaft. On the side of the rocking frame are mounted two pawls 96 and 97, Figs. 9, 20, 21 and 22, which are journaled on pins 96ª and 97ª respectively. The pawls 96 and 97, which are on the forward side of the rocking frame, Figs. 7 and 9, are adapted to engage, when tripped by the control mechanism described below, with square teeth on the ring shaped member 98, Fig. 21, which corresponds to the master cam in Patent No. 1,944,585. As shown in Fig. 7, the ring or master cam member 98 is located in front of rocking frame 95 and, like the frame, is journalled on flange 95ᵇ. It is the movement of this master cam member, operated by the pawls, which operates the various clutches above referred to, thereby effecting the several gear changes. And it will thus be apparent that, as in said prior patent, the shifting is effected in response to the tripping of the pawls, this in turn being under the automatic control now to be described.

It will be understood that the yielding and recoil of the springs 23, Figs. 5 and 7, under varying torque output of the motor causes a corresponding turning of the hub or sleeve portion 99 of cover 29, in relation to clutch shaft 28. Specifically, sleeve 99 advances by a certain amount under increase of torque, in relation to shaft 28. Such relative motion is communicated by splines to the hub and flange 100, and through screws 101 to flange 102. By means of appropriate spacing of the screw holes 101ª in flanges 100 and 102 a vernier adjustment is provided between them. As mentioned above, the member 35 is splined to the clutch shaft 28, and consequently the relative motion between the sleeve 99 and shaft 28 also obtains between flange 102 and member 35, the flange being journaled for free turning movement thereon, and held in definite endways relation thereto by a snap ring 103. Flange 102 comprises also the frame of the centrifugal speed governor shown in Figs. 28, 35-37. This consists of two identical weights 104, one of which is shown in Fig. 37; they are hinged on the frame 102 (between the parts marked 102ª in Fig. 36) by two pins 105 and swing outward under the influence of centrifugal force against the springs 106. The holes in the governor frame and in the governor weights in which pins 105 seat are marked 105ª and 105ᵇ, respectively, in Figs. 35, 36 and 37. Said springs are anchored by suitable screws and pads at 107 to the weights 104, and each bears, through roller 108, on curved surface 109 of the opposite weight. The dimensions of springs 106 and the contour of curves 109 are suitably calculated so that the swing of weights 104 around their hinge pins is approximately proportional to the speed of the motor over a wide range. In each weight is fixed a pin 110, having a hemispherical head; and it will be noted, Fig. 28, which is a rear elevation, that the opening of the weights under increased speed swings the pins 110 outward and in a retarded direction relative to shaft 28 and member 35, as opposed to the action of the torque springs 23, the yield of which swings the governor as a whole to an advanced position under increase of torque.

The pins 110 impinge on a circular face cam member 111, the cam or forward side of which is shown in Fig. 29. The position of the pins on the cam under no-load and no-speed condition is indicated by the dotted circles 112, and the path of their movement due to increase of speed, i. e. as the fly weights open, is shown by dotted lines 113; and under increase of torque, i. e. under yield of the springs, by dotted lines 114. For combined increase of speed and torque, under operating conditions, it will be understood that the pins will impinge over a working area outside these lines. Cam member 111 is mounted for fore and aft movement on member 35, but is keyed against turning thereon. A light spring 115, Fig. 7, urges the cam member 111 forward against the pins 110; and the cam face is provided with three sets of lands, connected by slopes. The triangular areas 116, Fig. 29, are high; the areas 117 are of half height; and areas 118 are low. Slopes 119 serve to connect the high, medium and low areas, so the round ends of pins 110 may move freely thereover. The slopes 120 are not used in normal operation, but serve to connect low areas 118 with high areas 116 so that the pins may be moved about against the cam for easy assembly. It will be seen from the above that as the pins 110 are swung in and out and advanced and retarded under the influence of varying speed and load of the motor and ride onto the various lands of the cam face, they cause cam 111 to move fore and aft on member 35. Such movement is imparted to a flat member 121, Figs. 7, 8, 9 and 33, hinged at 122 to a fixed bracket and serving as a trip shoe to regulate the action of the pawls 96 and 97, the latter being urged inwardly by light springs or other appropriate means, not shown.

Connection is made between the shoe 121 and a groove in the cam member 111 by means of two shoes 123, Fig. 7. These shoes are mounted on flat springs 124, and are definitely located in normal position by two retaining strips 125, against which the springs 124 bear. As shown more particularly in Fig. 7, the trip shoe is slotted to accommodate springs 124. There is thus provided a yielding connection between cam 111 and shoe 121, permitting relative movement between them. The reason for this yielding connection will be presently explained. In Figs. 7 and 22 the trip shoe 121 is shown in its middle position, which obtains when the pins 110 rest on the medium height lands 117 of the cam 111. As the pins 110 impinge on the other lands, it will be seen that the trip shoe 121 will be swung forward or back as the case may be.

Referring to the pawls 96 and 97, Figs. 9, 21 and 22, each one carries a small shaft set in its working end; and on the shaft ends are mounted rollers 126 and 127 respectively. The roller shafts are of such length, as shown, that rollers 126 and 127 rest on the rear and forward edges respectively of the end of the trip shoe 121, when the latter is in its median position. When, however, the speed-load conditions move pins 110 to the higher lands 116 of cam 111, the rearward movement of trip shoe 121 allows roller 127 to move inwardly, engaging pawl 97 with the teeth on the master cam 98. Conversely, when, under high torque and less speed, pins 110 are moved to impinge on the low lands 118 of cam 111, and the trip shoe 121 swings forward, the roller 126 moves inwardly and pawl 96 is engaged with the teeth on master cam 98. The yield springs 124 above referred to, ensure that no excess pressure will be set up between the cam and the trip shoe in the event the former is moved at a time when one of the pawl rollers happens to be down. When one of the rollers is down and the shoe is urged to the opposite side, which would allow the other one to drop, the roller, which is down restrains the trip shoe until after the working end of the other pawl has passed the tooth with which it might engage, thus providing an interlock against immediate reversal of movement of the master cam, in the same manner as described in Patent No. 1,944,585.

It will be seen that a portion of the master cam 98 carries gear teeth which mesh with gear 128, fixed to shaft 81, Figs. 5 and 21. The pitch diameters of these gears are such, in relation to the spacing of the teeth for the pawls on the master cam, that one step movement of the master cam by a shifter pawl 96 or 97, i. e. one stroke of the rocking frame, will swing the gear 128 and shaft 81 through ⅙ of a complete revolution. Upon shaft 81 are fixed three cams 129, 130 and 131, Figs. 5, 9 and 20. The cams 130 and 131 serve, respectively, to operate the friction clutches 47 and 49, through the arms 132 and 133, for clutch 47, and through arms 134 and 135 for clutch 49, the said arms carrying rollers for contact with the cams. The arms 132 and 133 are threaded together at 136, Fig. 7, and the inner one, 133, is mounted on the thrust bearing 41. The outer one abuts one side of a thrust bearing 137, the other side of which is mounted on a spring retaining member 138. Member 138 is splined for fore and aft movement within the driven member 40, and is also firmly clamped to pressure plate 139 by screws 140 and sleeves 141. Clutch springs 142 are mounted in holes in member 40 and exert pressure between it and member 138, which pressure is transmitted through screws 140 and sleeves 141 to the pressure plate 139. The driving plates 143 are splined on their outer circumferences to member 47 and between them are driven plates 144, each splined on its inner circumferences to member 40. The hub portions of arms 132 and 133 are so threaded that when the arms are spread apart, as in Fig. 20, by the cam 130, the hub of arm 133 pushes back against bearing 41 and the hub of arm 132 pushes forward on bearing 137, which, in turn, moves forward the spring retaining member 138 and with it the pressure plate 139, against the force of springs 142. This releases the pressure on driving and driven plates 143 and 144, and opens the clutch. When rotation of shaft 81 brings the low lands of cam 130 between the rollers on arms 132 and 133, allowing them to approach each other, the threaded hubs retract and allow the pressure of springs 142 to grip the plates 143 and 144 between plate 138 and member 40, so that the clutch is engaged and transmits power from the outer member 97 to the inner member 40. The parts and operation of clutch 49 are similar to those of clutch 47.

In Fig. 21 the rocking frame and pawls are shown in their median position, up and down; and the oscillation of the rocking frame carries the pawls sufficiently beyond the adjacent teeth to afford ample opportunity for engagement when the rollers are allowed to fall by the trip shoe 121. The position of the master cam 98 shown in Fig. 21 is that for low speed; and if then pawl 97 is tripped, no movement can ensue, as there is no tooth for it to engage. If pawl 96 is tripped, it picks up the first tooth, at the top of its stroke, and carries the master cam one step counter-clockwise on its ensuing down stroke. The consequent rotation of the shaft 81 brings the low sides of cam 131 between arms 134 and 135, closing clutch 49 and engaging second speed. If pawl 96 be again tripped, as for instance in normal starting of the vehicle from rest and attaining usual driving speed, it picks up the next tooth, moves the master cam another step counter-clockwise, swings shaft 81 another sixth of a turn and brings the low sides of cam 130 between arms 132 and 133, engaging clutch 47 and establishing direct drive. A masking cam described below, then prevents further engaging of teeth by pawl 96, in normal operation, so that further counter-clockwise movement of the master cam is not possible. The next two teeth are for putting the driving gears and clutches into a solid drive in second speed, under regulation by the operator as described in the next paragraph. From the description of the driving gears and clutches hereinbefore contained, it will be seen that in normal operation, the one-way clutches on the lay shaft provide free wheeling in low and second speeds but that in direct drive, or high, the friction clutch 47 holds the motor both ways, for driving and for retarding the vehicle.

To enable the vehicle to descend long or steep hills in second speed, as above mentioned, a manual control is provided which may conveniently be in the form of a conventional Bowden wire button, operated from the instrument panel, like the usual choke, and serving to set the transmission in a two-way drive and suspend the operation of the automatic control by the speed-torque gauge device. As herein exemplified, such a wire 145, extending to any convenient point of control, is connected at 146, Figs. 8, 9, 15–19, to an arm 147 journaled on a fixed stud 148. The arm 147 carries a pin 149 on which is pivoted an intermediate shoe 150, and pin 149 also engages arms or projections on trip member 151, also journaled on stud 148. The trip member 151 carries on the end of a flexible portion a foot 152, projecting downwardly and having a round end adapted to engage a cut in the trip shoe. Said cut has edges beveled at approximately 45 degrees, so that when the member 151 is swung one way or the other by the action of the pin 149, the trip shoe 121 is moved forward or back, against the yield springs 124, to trip one or the other of the pawls 96 and 97. Thus when the arm 147 is pulled up by the manual control, Figs. 17 and 18, the pin 149 engages member 151 and swings the foot 152 towards the center of the box, causing it to impinge on the inner beveled edge 153 of the cut in the trip shoe 121 and swing the latter to the rear, which trips the upshift pawl 96. However, when the arm 147 is held down by the Bowden wire, Figs.

15 and 16 (as in normal operation) a projection 152ª on the side of foot 152 meets the inner surface of cam 154, which protrudes from the side of the master cam 98, Fig. 21. The cam 154 thus prevents the foot 152 from reaching the outer bevel edge of the cut, and holds it in a central position, as shown in Figs. 15 and 16, where it has no effect on the trip shoe 121. Cam 154, however, is cut away at such a point that when the master cam is beyond the position shown in Figs. 15 and 16, and the foot 152 is swung outwards by the downward movement of arm 147, Fig. 19, it may then engage the outer beveled edge of the cut in trip shoe 121 and swing the latter forward to cause tripping of the downshift pawl 97.

The intermediate shoe 150 has projections on either side, Fig. 9, one of which rests on top of an arm 155, journaled between the trip member 151 and the arm 147 on stud 148; the other projection lies under an arm 156, which is the innermost part journaled on stud 148. As the arm 147 is moved up or down by the Bowden wire, 145, the intermediate shoe 150 is moved to the right or left, accordingly, by the pin 149 upon which it is hinged. The top of arm 155, upon which the intermediate lever rests, is flat; and the under side of arm 156 which engages the intermediate shoe makes an angle therewith, so that when the shoe is moved away from its position shown in Figs. 15, 16 and 19, to that shown in Figs. 17 and 18, the shoe allows the two arms to approach each other.

The lower end of arm 156 rests upon the outer side of the cam 154, as shown by dotted lines in Figs. 8, 15-19. The lower portion of arm 155 serves as an auxiliary shoe for engaging the roller 126 on the upshift pawl 96. Its normal position is that shown in Fig. 8, where it is clear of said roller and has no effect on the tripping thereof for shifts. This position obtains when the lower end of arm 156 rests on the lower portion of the outside surface of cam 154. When, however, the master cam is swung to the high speed position as shown in Fig. 15, the higher part of cam 154 comes under the arm 156, lifting the lower end and pressing down the upper end against the intermediate shoe 150, which operates to depress the upper end of arm 155, lifting out the lower end of arm 155 sufficiently far to hold up the roller 126 and keep pawl 96 from engagement with the teeth on the master cam. This serves in normal operation to prevent movement of the master cam beyond the high speed position. However, when the operator, through the Bowden wire control, pulls up the end of arm 147 and withdraws the intermediate shoe from its normal position between arms 155 and 156, it will be seen that the pawl 96 may engage the teeth on the master cam, even when the same is in the high speed position; and that the simultaneous swinging of the trip member 151 causes the shoe 121 to trip the said pawl 96 for engagement, regardless of the speed-load conditions obtaining at the time. The next two oscillations of the rocking frame then will serve to put the master cam in its farthest counterclockwise position, two steps beyond that of high speed, which causes the establishment of solid drive in second speed as described below. While the master cam is in this extreme position, it will be seen from the foregoing description that when the operator pushes back the Bowden wire control, Fig. 19, depressing the arm 147, the intermediate shoe will be restored to its operative position between arms 155 and 156, and that the trip shoe 121, by means of the foot 152 on member 151, will be caused to trip the pawl 97 for downshifts, bringing the master cam, in two steps, back to its high speed position, Fig. 15, and that when it reaches that position the high land of the under side of cam 154 will move the foot 152 to its inoperative position. Thereafter normal up and down shifting will be resumed.

Figs. 23-27 show the relation of the end cam faces on cams 129 and 130, which operate jaw clutch 65 for solid drive in second speed, through the fork 157, which is journaled for fore and aft movement on shaft 81 and has a rearward projection 158 and a pin 159 which engage with cams 130 and 129 respectively, Fig. 5. The pin 159 is held by a spring 160 against a stop, for definite location and possibility of yielding. In Figs. 23-27 the cam 130 is shown in its true position, between the rollers of arms 132 and 133, cam 129 being shown above, for clearness, in corresponding figures numbered 23ª, etc. The high land on cam 130 is indicated by cross hatching, and the slope between it and the low land is designated as 161. The position of the projection 158 on the hub of fork 157 is also indicated by cross hatching. As Figs. 23-27 are front elevations, the working face of cam 129 is on the far side; and the high land thereon is indicated by cross hatching, and the position of pin 159 against it is indicated by dotted circles. The slope between the high and low lands on cam 129 is designated as 162. Figs. 23ª and 23 show the low speed position of cams 129 and 130; Figs. 24ª and 24 the second speed position; Figs. 25ª and 25 the high speed position, with arms 132 and 133 allowed to approach each other for engagement of clutch 47; Figs. 26ª and 26 show the intermediate step between high speed and solid drive in second speed; and Figs. 27ª and 27 the position of solid second. In Figs. 23, 24 and 25 it will be seen that the high land of cam 130 is under the projection 158, which holds fork 157 forward and keeps clutch 65 from engaging. In Fig. 26 projection 158 is over the low land of cam 130, leaving fork 157 free to move to the rear, while the pin 159 is part way up the slope 162 (between high and low lands of cam 129) which urges fork 157 part way to the rear, and clutch 65 into partial engagement with the jaws on the gear 52. Also it will be seen that the peripheral cam faces of cam 130 have spread apart the arms 132 and 133, opening clutch 47. At the same time the cam 131, Fig. 20, will also have made a half turn from its position shown in Fig. 20, so the arms 134 and 135 are apart, opening clutch 49. Thus both second and high speed clutches are opened by the movement from high speed position to that of Fig. 26, and the timing of the cams is such that said opening of the clutches 47 and 49 precedes the time of first engagement of pin 159 with slope 162, so there can be no load to be taken up by jaw clutch 65 when it makes its first engagement with the gear 52; the momentary pause in this position gives opportunity for said jaw clutches to find their engaging relation, under pressure from spring 160. From the position of Figs. 26 and 26ª, the step to that of Figs. 27 and 27ª first causes the pin 159 to ride up the rest of the way onto the high land of cam 129, which fully engages clutch 65 with gear 52; and then cam 131 permits engagement of clutch 49 for drive in second speed, which is rendered solid or two-way by clutch 65. Meanwhile clutch 47 is held open by cam 130. It will be understood that the above sequence of operations is reversed when, as previously described, the operator restores the Bowden wire control 145 and trips the power shifting mechanism for return to normal high speed position.

The selection of the various forward speeds in accordance with the speed-load conditions under which the motor operates, as described above, may be termed the normal functioning of the automatic control and it will be noted that, as distinguished from the disclosure of Patent 1,944,585, no superseding control based on extremes of engine speed is provided. There is provision, however, for superseding control based on other factors and serving to take care of special conditions of vehicle operation which render desirable some departure from the normal functioning of the automatic control. For example, a car equipped with such a fully automatic gear shift may be slowed down to a speed of but a few miles per hour and still remain in high gear, such a situation occurring in the absence of any load condition calling for a downshift. Accordingly, the gear setting is not appropriate to rapid acceleration of the car, should that then be desired, and, while the load condition imposed as soon as acceleration is begun will bring about a downshift to a lower gear setting, the slight delay occasioned by the operation of the automatic controls arriving at such a lower gear setting may be considered to be objectionable.

Again, it may happen that when ascending an incline at some speed, sudden deceleration is necessary, as when another vehicle is observed to be approaching from a side street, or when a pedestrian steps into the road, and not infrequently, such other vehicle stops, or the pedestrian steps back off the road, with the result that it is in order again to accelerate. In such circumstances the relieving of the load on the engine, brought about by the sudden deceleration, will have called for an up-shift to a higher gear setting and such setting may not be appropriate to the re-acceleration referred to. This again may be considered objectionable.

According to my invention several means are provided whereby these objections may readily be overcome, such means, as above stated and as will now appear, being adaptable individually or (with mutual advantage) collectively to any automatic gear shift having speed-torque gauge control operating directly or indirectly in response to or in substantial accordance with varying engine speed and torque conditions.

From the description previously given, it will be understood that the application of power to effect the shifting from one gear setting to another is directly responsive to movement of trip shoe 121—forwardly to release the down shift pawl and rearwardly to release the up shift pawl; also that since the movement of the speed-torque control device is transmitted to the shoe through springs 124, the shoe is movable independently of the speed-torque control device and, by the same token, may be held stationary against movement of it by the control device. Such factors are made use of in the application of the special controls now to be described, means being provided capable of actuating the shoe to effect a shift or of holding it stationary to prevent a shift, as the conditions above alluded to may require or as may be preferred and regardless of the action of the control device. Illustrative embodiments of the several arrangements are shown in Figs. 6, 7, 30 to 34.

Passing through shaft 50 is a rod 163 which at its forward end is adapted to engage the free end of trip shoe 121, i. e. the end of the shoe remote from the pawls. As shown, the rod passes through the shoe and on the forward end of the rod, adjacent the shoe, is a head 164, which serves, as below described, either as a stop to prevent forward movement of the lower part of the shoe (thus preventing an upshift) or to move the free end of the shoe rearwardly, to effect a downshift.

As shown in Fig. 7, the rear end of rod 163 also carries a head, marked 165, loosely fitting the bore in the reduced end of shaft 50 and urged rearwardly by spring 166, which latter is strong enough to overcome springs 124 and move the lower end of the shoe 121 rearwardly.

Mounted on the rearwardly extending hub of gear 53 (Fig. 7) is a governor frame 167 having fly weights 168, the fingers 169 of which overlie head 165. As will be understood, this governor is always driven at a speed proportional to that of the propeller shaft and hence of the car, with the result that when the car is stationary the weights are collapsed and rod 163 occupies its extreme rearward position, in which it draws the lower end of trip shoe 121 rearwardly to effect a down-shift. Until the car speed, increasing, reaches a point where the weights expand and their fingers 169 move rod 163 forwardly no upshift is possible and, conversely, whenever the car speed, falling, reaches a point where the weights are collapsed by spring 166, rod 163 moves rearwardly and immediately effects a down-shift. Manifestly the car speed at which this occurs depends upon the weight of the governor weights 168 and the strength of spring 166, which factors may be correlated as desired. It has been found, for example, that a down-shift occurring at 4 to 6 miles per hour, regardless of the then load on the engine, is advantageous to meet certain of the conditions hereinabove alluded to.

On occasion it is also of advantage to effect a down-shift at some higher or different speed from that for which the car-speed governor and spring 166 are set and for this purpose means are provided which make use of the driver's manipulation of one of the normal controls, such as the clutch pedal.

In Figs. 6 and 7, the head 164 on the forward end of rod 163 is shown as a cup member slidably mounted on pedestal 170 and telescopically engaged by another cup member 171, the cups being urged apart by spring 172. Cup 171 engages cam 22 which is mounted on clutch pedal shaft 5 and is so shaped and located as to move cup 171 rearwardly whenever the clutch is disengaged. The pressure of spring 172, which may be relatively stiff, is thereby added to that of spring 166 to effect closing of weights 168 at a higher car speed, say 12 or 14 miles per hour.

Since the action of the clutch pedal thus to effect a down-shift may be and in the preferred form illustrated is in turn controlled by governor 168, no down-shift will follow disengagement of the clutch at a speed higher than that at which the combined pressures of springs 172 and 166 will serve to collapse the governor weights, although if desired, these controls may be used alternatively. In Fig. 31, for instance, the governor rod 163 terminates in an enlarged head 173 having no connection with the clutch pedal and, conversely, in Fig. 32 the clutch pedal control is shown dissociated from the governor.

In the preferred form of the invention, there is provided a further control likewise adapted to be correlated to the others, or used independently thereof, for the purpose of controlling shoe 121 under other of the conditions above alluded to, viz., to effect a down-shift (or simply prevent an up-shift), when the engine load is suddenly relieved while the car is climbing a hill. Such a control is illustrated in Figs. 33 and 34 combined with the car-speed governor already described.

For the purpose of effecting such further control the governor frame 167 is constituted an inertia member or governor and to that end is mounted on the hub of gear 53 not directly but so as to be capable of limited movement with respect thereto, as by means of pins 174 which pass through the governor frame and, at their inner ends, engage spiral slots 175 in the hub of gear 53. In the result, the inertia of the governor causes it to over-run the hub of gear 53 in the event the car speed is quickly reduced and, in so doing, the governor is caused to move longitudinally (rearwardly) by the slope of slots 175. Such movement of the governor, as will be understood, permits spring 166 to move rod 163 rearwardly and thereby control the trip shoe 121, either by blocking its movement to the up-shift position or (if slots 175 permit sufficient rearward movement of the governor and hence of the rod) to draw the shoe into down-shift position.

As will be understood, the car-speed governor above described serves also to insure that the transmission controls and, in particular the master cam, are brought into first speed position when the car is brought to rest, in readiness for the next start whether it be after a temporary stop at a traffic light or after the car has been parked. If the car-speed governor be not employed, the clutch pedal control can be used to serve this purpose.

In Figs. 8–14, it will be noted that the arm 155 has an upwardly projecting extension 176 which engages the under side of bar 78. The forward end of such bar has a beveled cut in its lower edge, Fig. 10, so that when it is moved to the rear for reversing, the bevel presses down the extension 176 of arm 155, the parts then assuming the position shown in Fig. 14. This lifts the lower or shoe end of arm 155 so that pawl 96 is held away from the teeth of master cam 98, preventing any up-shifts while reverse drive is engaged.

By way of résumé:

Aside from the various supplemental controls, the speed-torque gauge control will be understood to effect all essential changes of transmission setting in accordance with the speed-torque conditions to which the engine is subject. That is to say, when the vehicle is operating in first speed it will so continue until the speed-torque conditions, manifested by the movement of pins 110 over the face of cam 111, cause the latter to move toward the rear of the box (Fig. 7) and, through shoes 123 and springs 124, move trip shoe 121 rearwardly far enough to drop roller 126. Up-shift pawl 96, which is carried by the constantly oscillating frame 95, is thereby permitted to drop into engagement with the teeth of member 98, rotating the latter and (through gear 139) the shaft 81, thereby bringing about the closing of clutch 49 and the engagement of second speed. The same sequence occurs for each successive up-shift. In the instant case further rotation of shaft 81 effects the closing of clutch 47 and thereby the establishment of "high" or direct drive. Conversely, down shifts are effected as the result of the speed-torque conditions being such as to cause face cam 111 to move forwardly in the box far enough to drop roller 127 and its down-shift pawl 97, which latter, similarly carried by the rocking frame 95 (but facing in the opposite direction to pawl 96) engages the teeth of member 98 and causes it (and shaft 81) to rotate in the reverse of the direction already described, thereby disengaging the clutch of the transmission setting, then in operation, and allowing the drive to be taken up by the next lower setting.

As above mentioned, the "shift lever" is ineffective to bring about a change of transmission setting, its only functions being to establish neutral, forward, or rearward drive connections. Consequently, if the car is travelling in high gear and is brought to rest and the engine stopped without there being imposed on the latter such load as would be necessary to bring about a down-shift, the transmission will remain in high until brought down by the load imposed upon re-starting the car. It is to avoid this situation and to meet certain special conditions encountered during driving that the various supplemental controls are provided, all of which modify the normal functioning of the primary or speed-torque control. This they do by exercising a superseding control over the trip shoe 121, which, having a yielding connection with cam 111 (through springs 124) can be held stationary (to prevent a shift) or moved forwardly or rearwardly (to effect a shift) regardless of the dictates of the speed-torque controlled cam 111. Briefly reviewed the functions and operations of these auxiliary controls are as follows:

*Car-speed governor.*—As above stated, its function is to enforce a down-shift at predetermined slow car speed to the end of insuring a low speed setting of the transmission appropriate to re-starting the car or to accelerating after turning a corner slowly.

The governor frame 167 (Fig. 7) is driven from the propeller shaft, thence at speeds proportional to those of the car through gear 53 and its weights 168, acting through their fingers 169 control rod 163, the head 164 of which in turn acts on the lower end of the trip shoe 121 to effect the desired down-shift. The adjustment of the parts is such that so long as the car travels at or above a predetermined minimum speed, say 4 to 6 miles per hour, the fingers 169 of the expanded weights 168 compress spring 166 and hold rod 163 forwardly of the box far enough to keep its head 164 out of contact with trip shoe 121; the latter is then free to respond normally to the speed-torque control, as above described. When, however, the car speed falls below the predetermined minimum, spring 166 collapses governor weights 168 and, forcing rod 163 rearwardly of the box, causes head 164 to engage trip shoe 121 and move it to its down-shift position. The shoe is held in this position (thereby preventing an up-shift) until the governor weights again expand i. e. until the car speed again exceeds the predetermined minimum.

*Clutch control.*—This likewise operates on the trip shoe 121 to enforce a down-shift and, while capable of use independently of and as an operator-actuated substitute for the car-speed governor control, is preferably (as shown) combined with the latter control to permit the driver to enforce a down shift at some speed other than that for which the car-speed governor is adjusted. This is accomplished in the form illustrated by providing a second spring 172 (Fig. 7) which has one end bearing against the inside of head 164 and its other end against the inside of cup 171 which bears against and is actuated, to compress spring 172, by clutch pedal operated cam 22. Thus when the driver throws out the vehicle clutch, cam 22 compresses spring 172, the force of which is thus added to that of spring 166 in opposition to the action of the governor weights 168. The combined action of the two springs is such as to collapse the weights (and move rod 163 to effect a down shift) at some speed higher than that at which spring 166 alone is effective for that purpose, the preferred adjustment being such that this higher speed is in the neighborhood of 12 miles per hour. Consequently, whenever the car speed falls to 12 miles an hour, or less, the driver can effect a down-shift by simply disengaging the vehicle clutch. This clutch, or otherwise manually-operated control, permits the driver to shift down to a transmission setting appropriate to some special road condition which he observes will require such a setting, such as a sharp turn onto a steep up-grade—without waiting for the speed-torque control to feel that condition. If the clutch is not disengaged, the car speed governor will bring about a down-shift in any event when the car speed falls to the lower predetermined minimum i. e. 4 to 6 M. P. H. And it will be understood, of course, that whenever the car speed falls as the result of engine load, the speed-torque control will effect the necessary down-shifting, in the manner already described, without regard to the action of the car speed governor or clutch controls.

*Inertia control.*—This is a convenient designation for another supplemental control likewise adapted to supersede the speed-torque control but adapted primarily to prevent its functioning to effect an up-shift as the result of sudden, temporary release of the load on the engine. For example, if the car is ascending a hill at fair speed in an intermediate gear setting and the driver momentarily lifts his foot from the accelerator in anticipation of the need for stopping suddenly and then, the need failing to materialize, he again depresses the accelerator, it is desirable that the car continue in the same gear setting, or at least not in a higher setting. But, as will be understood, the act of suddenly removing the foot from the accelerator releases the engine of all load and, in the absence of the inertia control, the speed-torque control immediately indicates and brings about an up-shift, thereby placing the transmission in a higher setting than is appropriate to resume the hill climb. Of course when the load is again applied the speed-torque control brings about a down-shift but the needless dual shift—up and down again—may be deemed objectionable and the inertia control constitutes a simple means for avoiding it. As with the clutch and car speed governor controls, it may be applied to the trip shoe independently of any other supplemental control but for convenience it is shown combined with these controls.

The desired result is accomplished by mounting the frame 167 of the car speed governor so that it is capable of limited movement relative to its driving member, viz. the hub of gear 53, as by the pin and cam slot connection 174, 175 (Figs. 33, 34). Thus, under the driving condition outlined, with its attendant decrease of speed of the car, the inertia of the governor causes it to overrun the hub of gear 53 and, by reason of the slope of slots 175, to move rearwardly of the box. In so doing the governor permits spring 166 (Fig. 7) to move rod 163 rearwardly and bring head 164 into position to control trip shoe 121. The resulting action depends upon the extent of this movement, as determined by the slots 175. It may be, and preferably is, sufficient only to bring head 164 into position to block the trip shoe against movement into its up-shift position but, as will be apparent, slots 175 may be made long enough to allow the governor to over-run so far as to permit head 164 actually to bring about a down-shift, should that be preferred.

*Solid second control.*—This is a convenient designation for that manually-operated control by which the driver can convert the transmission as a whole from its normal over-running or "free-wheeling" condition with automatic shifting into a two-way or "solid" drive in some intermediate setting, herein second speed, such setting continuing until the driver again manipulates this control. The purpose is to permit the driver to take advantage of the braking effect of the engine compression when descending steep hills.

As described, blocking means are provided which in the normal operation of the box serve to prevent the up-shift pawl from being again tripped after the ring member ("master cam") 98 and cam shaft 81 have been rotated far enough to set the transmission in high gear and the primary mechanical function performed by the driver's manipulation of the solid second control is to release such blocking means and thereby permit the up-shift pawl to rotate member 98 and cam shaft 81 to a further station, beyond high. In moving to such station cam shaft 81, as described above in detail, first causes both the second and high speed clutches (49 and 47, Fig. 7) to be opened, then normally overrunning gear 52 to be clutched to the lay shaft and then second speed clutch 49 to be engaged, resulting in solid or two-way drive in second speed.

When the solid second control is restored to its normal position the down-shift pawl is tripped, thereby permitting it to rotate member 98 and cam shaft 81 back to high speed position. In its return movement, cam shaft 81 effects the reverse of the clutching operations just referred to and so restores the transmission to its normal high speed setting subject to control by the speed-torque device.

I claim:
1. In an automobile, the combination with the engine and a multiple ratio transmission, of an operator's control member for initially setting said transmission for starting, a speed-torque gauge device adapted to control the setting of each ratio of the transmission during normal running, a second operator's control member and means actuated thereby for effecting a change of setting of said transmission independently of said device.

2. In an automobile, the combination with the engine and a multiple ratio transmission, of an operator's control member for initially setting said transmission for starting, a speed-torque gauge device adapted to control the setting of each ratio of the transmission during normal running, means operable independently of the action of said device to effect a down-shift of said transmission and a second operator's control member adapted to cause actuation of said means.

3. In an automobile, the combination with the engine, multiple ratio transmission and vehicle clutch, of a speed-torque gauge device adapted to control the setting of the transmission, and means operated coincidently with the disengagement of the clutch to adjust said transmission from a higher to a lower setting independently of said device.

4. In an automobile, the combination with the engine, multiple ratio transmission and clutch, of a speed-torque gauge device controlling the setting of said transmission, and clutch operated means controlling the latter independently of the action of said device.

5. In an automobile, the combination with the engine and a multiple ratio transmission, of control means for the latter, a speed-torque gauge device adapted to cause actuation thereof in substantial accordance with the speed-torque conditions of the engine, and a device associated with said means and adapted to cause actuation thereof in response to predetermined vehicle speed.

6. In an automobile, the combination with the engine, and a multiple ratio transmission, of control means for the latter, a speed-torque gauge device associated with and controlling said means, and a device responsive to predetermined low speed running of the vehicle to cause actuation of said means to effect a down-shift independently of said first-mentioned device.

7. In an automobile, the combination with the engine and a multiple ratio transmission, of a control member for the latter movable in one direction to effect a down-shift and in the opposite direction to effect an up-shift, a speed-torque gauge device associated with and controlling said member, means whereby the latter is movable independently of said device, and a device responsive to vehicle speed also associated with and adapted to move said member.

8. In an automobile, the combination with the engine and a multiple ratio transmission, of a control member for the latter movable in one direction to effect a down-shift and in the opposite direction to effect an up-shift, a device responsive to vehicle speed associated with said member and adapted to maintain the same in its down-shift position when the vehicle is at rest or travelling at less than a predetermined low speed, and a speed-torque gauge device associated with and controlling said member at and above said predetermined low speed.

9. In an automobile, the combination with the engine and a multiple ratio transmission, of an operator's control member for initially setting said transmission for starting, a speed-torque gauge device controlling said transmission throughout normal running, a vehicle-speed responsive device adapted to adjust the setting of said transmission under predetermined vehicle speed conditions, a second operator's control member, and means actuated by the latter for adjusting said transmission from a higher to a lower setting.

10. In an automobile, the combination with the engine and a multiple ratio transmission, a speed-torque gauge device normally controlling the setting of the transmission, manually-operated means and a vehicle speed responsive device both operable to adjust said transmission from a higher to a lower setting, said means and last-mentioned device being operable independently of said first-mentioned device.

11. In an automobile, the combination with the engine and a multiple ratio transmission, a speed-torque gauge device normally controlling the setting of the transmission, a vehicle speed responsive device, means operable thereby independently of said speed-torque gauge device to adjust the setting of said transmission from a higher to a lower setting at predetermined vehicle speed, and an operator's control member operable to actuate said means at different vehicle speed.

12. In an automobile, the combination with the engine and a multiple ratio transmission, of a speed-torque gauge device normally controlling the setting of the transmission, manually controlled means for adjusting the setting thereof, and a vehicle speed responsive device controlling said means.

13. In an automobile, the combination with the engine, multiple ratio transmission and clutch, of a speed-torque gauge device controlling the setting of said transmission, clutch operated means controlling the latter independently of said device and means responsive to the speed of the vehicle associated with and controlling said clutch operated means.

14. In an automobile, the combination with the engine, multiple ratio transmission and clutch, of a speed-torque gauge device controlling the setting of said transmission, means operable coincidently with the operation of the clutch for effecting a down-shift independently of said device, a vehicle speed responsive device associated with said means and adapted to render the same inoperative above a predetermined vehicle speed.

15. In an automobile, including an engine, clutch, a multiple ratio transmission, control means for the latter, and a speed-torque gauge device associated with and normally actuating said means in accordance with the speed-torque conditions of the engine, the combination of a vehicle-speed responsive device adapted to cause actuation of said means when the vehicle speed falls to a predetermined limit, means operated coincidentally with the disengagement of the clutch to cause actuation of said control means at a predetermined vehicle speed greater than said limit, and means adapted to prevent actuation of said control means in immediate response to predetermined change of torque.

16. In an automobile, including an engine, clutch, a multiple ratio transmission, control means for the latter, and a speed-torque gauge device associated with and normally actuating said means in accordance with the speed-torque conditions of the engine, the combination of a vehicle-speed responsive device adapted to cause actuation of said means when the vehicle-speed falls to a predetermined limit, means operated coincidentally with the disengagement of the clutch to cause actuation of said control means at a predetermined vehicle-speed greater than said limit, and an inertia governor adapted to control said first-mentioned means under predetermined conditions of vehicle operation.

17. In an automobile including an engine, clutch, a multiple ratio transmission, control means for the latter, and a speed-torque gauge device associated with and normally actuating said means in accordance with the speed-torque conditions of the engine, the combination of a vehicle-speed responsive device adapted to cause actuation of said means when the vehicle speed falls to a predetermined limit, and means adapted to prevent actuation of said control means in immediate response to predetermined change of torque.

18. In an automobile, including an engine, clutch, a multiple ratio transmission, control means for the latter, and a speed-torque gauge device associated with, and normally actuating said means in accordance with the speed-torque conditions of the engine, the combination of a vehicle-speed responsive device adapted to cause actuation of said means when the vehicle speed falls to a predetermined limit, and an inertia governor adapted to control said first-mentioned means under predetermined conditions of vehicle operation.

19. In an automobile the combination with the engine and a multiple ratio transmission, of an operator's control member adapted to establish forward and reverse drive settings of said transmission, a speed-torque gauge device adapted to effect adjustment of said transmission, in its forward drive setting, and to effect a down-shift only when the engine is under load, and means operating independently of said control member and of said device for effecting a down-shift of said transmission.

20. In an automobile, the combination with the engine and a multiple ratio transmission, of an engine-driven governor having a fly weight member adapted for angular displacement about the governor axis in response to engine speed variation, a face cam engaging said member and mounted coaxially with the governor, an engine torque spring, means whereby the face cam is angularly displaced about the governor axis in accordance with the yield of said spring, and transmission control means responsive to the differential action of said cam and member.

21. In an automobile, the combination with the engine and a multiple ratio transmission, of an engine-driven governor having a fly weight member adapted for angular displacement about the governor axis in response to engine speed variation, a face cam engaging said member and mounted coaxially with the governor, an engine torque spring, means whereby said cam is axially movable in response to angular displacement of said member and cam with respect to each other and transmission control means associated with said cam and arranged for actuation by said axial movement thereof.

22. In an automobile, the combination with the engine, a multiple ratio transmission and shifting means therefor, of a torque gauge device including a cam member subject to displacement according to the engine torque, a speed responsive device comprising an engine-driven governor having a member responsive to the action thereof and engaging the cam, said devices being associated with and differentially controlling said shifting means and said cam having a neutral zone surface adapted to render ineffective predetermined relative displacement of said members.

23. In an automobile, the combination with the engine, a multiple ratio transmission and shifting means therefor, of a torque gauge device including a rotary, face cam member, a speed responsive device comprising an engine-driven governor having a member responsive to the action thereof and engaging the face of said cam, said devices being associated with and differentially controlling said shifting means and said face of the cam having a neutral zone surface in the plane of rotation of the cam.

24. In an automobile, the combination with the engine of a multiple ratio transmission of the one-way drive type, a speed-torque gauge device normally adapted to control all of the settings thereof, and means for coincidently establishing a two-way drive in one of said ratios and rendering said speed-torque gauge device ineffective to control the transmission.

25. In an automobile, the combination with the engine of a multiple ratio transmission of the one-way drive type, an actuating member for adjusting the transmission and having a plurality of stations at each of which it causes driving engagement in one of said transmission ratios, a speed-torque gauge device normally controlling the actuating member, said member having another station at which it causes two-way driving engagement in one of said ratios and manual means for coincidently rendering said device ineffective and causing the actuating member to move to its said other station.

26. In an automobile, the combination with the engine of a multiple ratio transmission of the one-way drive type, an actuating member for adjusting the transmission and having a plurality of stations at each of which it causes driving engagement in one of said transmission ratios, a speed-torque gauge device normally controlling the actuating member, said member having another station at which it causes two-way driving engagement in one of said ratios, means normally preventing movement of said member to such further station and manually controlled means for coincidently rendering said preventing means and said speed-torque gauge device ineffective to perform their respective functions and causing said member to move to its said other position.

27. In an automobile, the combination of a plurality of sets of gears, a plurality of friction clutches engageable to connect said gears in transmission drives of different ratio, an over-running clutch for each of said drives and a speed-torque gauge device adapted to control said friction clutches.

28. In an automobile, the combination of a plurality of sets of gears, a plurality of friction clutches engageable to connect said gears in transmission drives of different ratio, an over-running clutch for each of said drives, power-operated means for engaging and disengaging said friction clutches successively, said over-running clutches permitting continuous engagement of any lower gear friction clutch during driving engagement through a higher gear clutch, and a speed-torque gauge device adapted to control the application of power to said means.

29. In an automobile, the combination with the engine, a multiple ratio transmission and an operator's control member for establishing forward, neutral and reverse drive connections, power means repeatedly connectible to effect the shifting of the transmission throughout the range of ratios, a control element movable to connect said power means, a speed-torque gauge device adapted to actuate said control element, and means for moving said element to effect shifting independently of said control member and of said device.

30. In an automobile, the combination with the engine and a multiple ratio transmission of power means repeatedly connectible to effect the shifting of the transmission throughout the range of ratios, a speed-torque gauge device normally controlling the connection of said power means, a vehicle clutch pedal and means operated thereby for connecting said power means independently of said device.

31. In an automobile, the combination with the engine and a multiple ratio transmission of power means repeatedly connectible to effect the shifting of the transmission throughout the range of ratios, a control element movable to connect said power means, a speed-torque gauge device adapted to actuate said control element and a device associated with said element adapted to actuate the same in response to predetermined car speed.

RUSSELL W. TODD.